Figure 1:
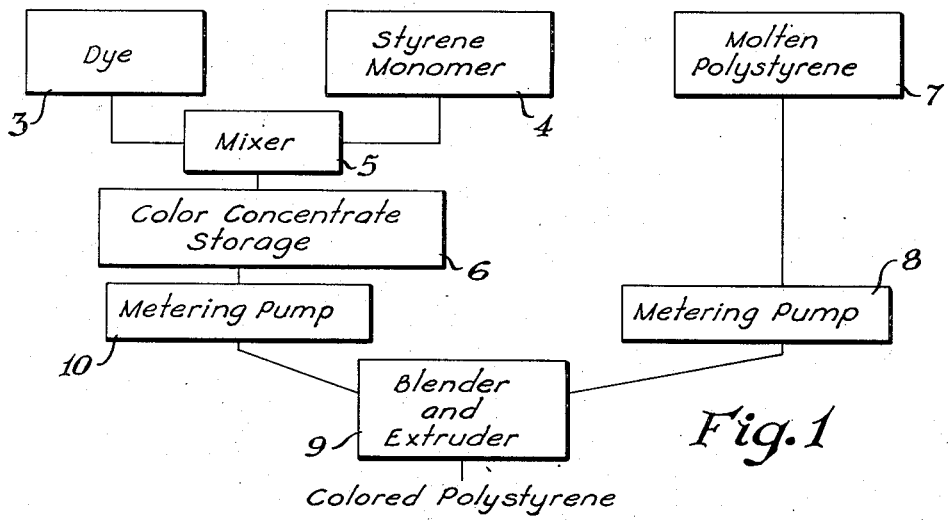

INVENTOR.
Kenneth E. Stober
BY
Griswold & Burdick
ATTORNEYS

Patented May 10, 1949

2,470,001

UNITED STATES PATENT OFFICE 2,470,001

PROCESS FOR PRODUCING UNIFORMLY COLORED EXTRUDED ARTICLES FROM VINYL AROMATIC RESINS

Kenneth E. Stober, Midland, Mich., assignor to The Dow Chemical Company, Midland, Mich., a corporation of Delaware Application May 30, 1945, Serial No. 596,627

5 Claims. (Cl. 18—55)

This invention relates to an improved process for producing uniformly colored articles from a thermoplastic resinous polymerized vinyl aromatic compound.

The coloring of a thermoplastic resin is usually carried out by working a pigment or dye into the uncolored resin on rolls or in a kneading machine. This procedure, although effective, necessarily involves all the limitations of batch-wise operation, especially the difficulty of maintaining uniformity of color from batch to batch. In addition, during the mixing, the resin becomes highly heated, and while in that state is often exposed to the air for a considerable period. As a result of this exposure, dirt and dust tend to become included in the product, and molecular degradation and even oxidative discoloration of the resin often occur.

With these difficulties in mind, it is the principal object of the present invention to provide an improved process, applicable especially in coloring vinyl aromatic resins such as polystyrene, which permits continuous production of uniformly colored material and largely eliminates exposure of heated resin to the air.

Basically, the new process involves first making a color concentrate by mixing the coloring material into a dispersing medium, and then melt-blending the concentrate into the body of the resin to be colored. The blending is preferably carried out continuously by delivering a stream of the color concentrate and a stream of the resin, both in the molten state, in controlled proportions into a closed mixing zone and therein working the materials together to form a uniformly colored mass, and extruding the mass. By operating in this manner, continuous production of a uniformly colored product is possible, and any given portion of the heated resin need be exposed to the air, if at all, for only a brief period.

The liquid dispersing medium used in making the color concentrate either is the monomer of the particular vinyl aromatic compound from which the resin to be colored has been formed, or is a thermoplastic vinyl aromatic resinous polymer. Such media are completely compatible with the resin to be colored, and, when mixed therewith in small proportion, do not appreciably alter its mechanical or electrical properties, since they are not, chemically speaking, foreign materials. The liquid monomers are especially effective media for blending in soluble dyes, while the polymers, when molten, are, because of their much higher viscosity, preferred for suspending pigments.

In so far as known, the new process is applicable generally to mixing coloring materials into thermoplastic resins formed by polymerizing vinyl aromatic compounds or mixtures thereof. Typical resins are the polymers of styrene, p-chlorostyrene, p-ethyl styrene, p-ethoxy styrene, vinyl naphthalene, and vinyl carbazole. At present, the invention finds its greatest use in the coloring of polystyrene.

The coloring materials employed are dyes soluble in the monomer from which the resin is formed, or finely-divided pigments. Most oil soluble dyes are effective. It is desirable to choose a dye or pigment the color of which is not altered by exposure to the temperatures at which the melt-blending step is carried out. Coloring materials which have been found especially suitable are:

| Dyes: | Color Index No. |
|---|---|
| Anthraquinone Blue Sky Base | 1089 |
| Oil Red O | 73 |
| Oil Yellow 515 | 19 |

| Pigments: | Gardner [1] page |
|---|---|
| Mapico Black | 1361 |
| Mapico Brown | 1227 |
| Monastral Fast Blue B | 1359 |
| Titanox-A, L. O. | 1228 |

[1] Physical and Chemical Examination of Paints, Varnishes, and Lacquers, 8th edition (1937).

Figure 2:
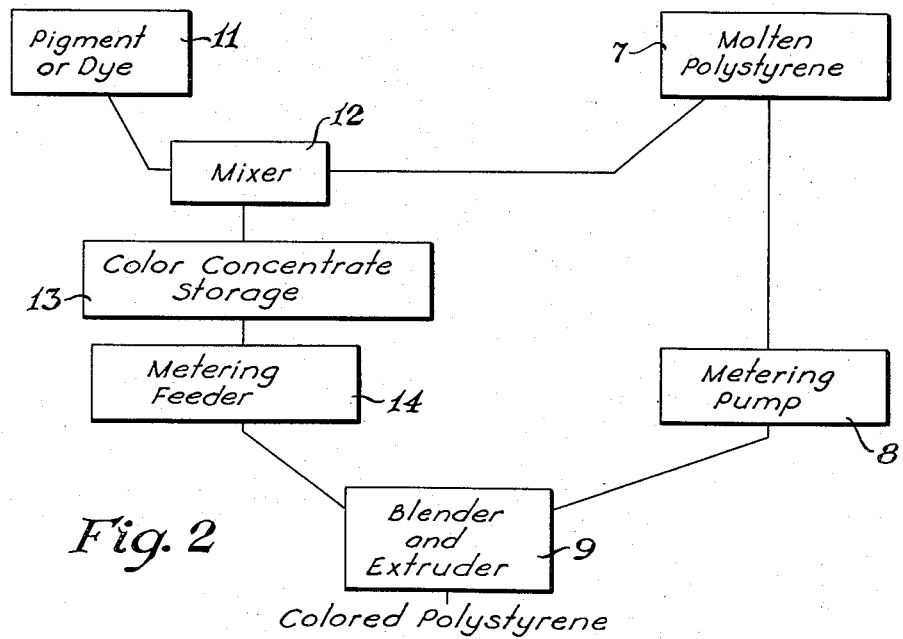

The invention may be further explained with reference to the accompanying drawing, in which Fig. 1 is a flow diagram illustrating the coloring of polystyrene, using styrene monomer as the color dispersing agent; and Fig. 2 is a similar diagram illustrating the use of polystyrene as the dispersing agent.

In the process of Fig. 1, which is particularly useful with soluble dyes, the dye 3 and monomeric styrene 4 are charged into a mixer 5, such as a tank provided with a propeller agitator, and stirred together to produce a uniform liquid color concentrate, which is transferred to a closed storage system 6. The relative proportions of dye and monomer may be varied within broad limits depending on the intensity of color desired in the final product, although dye concentrations of the order of 0.05 to 5.0 per cent by weight of the monomer are preferred.

The polystyrene to be colored, which is usually maintained molten in a closed storage vessel 7, or which may be melted continuously as required, is transferred by a metering pump 8 as a continuously flowing stream into an enclosed plastic blending and extruding system 9. At the same time, a relatively much smaller stream of color concentrate is metered by a pump 10 into the mixer 9. The rates of delivery of the two pumps 8 and 10 are carefully controlled at a constant ratio to insure uniform color intensity in the final product. In general, best results are obtained when the stream of color concentrate represents between 1 and 3 per cent by weight of the polymer stream.

In the blending system 9, which is maintained at a temperature at which the polystyrene is freely fluid, e. g. at least 200° C., and preferably about 250° C., the two streams are worked together mechanically by a kneading or stirring action, without exposure to the air, to produce a uniformly colored plastic mass. This mass is then forced through an extrusion orifice, preferably as fast as it is produced, and the extruded product is drawn away and cooled to final form.

This melt-blending of color concentrate and uncolored resin may be carried out in any type of enclosed mechanical mixing equipment, preferably one in which the materials are worked together while in continuous flow. The extrusion of the colored mixture as it is formed may likewise be accomplished in various machines. A particularly convenient apparatus, in which a screw extruder is fitted with special mixing disks, and which in a single machine performs the functions both of mixing and of extrusion on a continuously moving stream of material, is described in a patent application Serial No. 596,626 filed May 30, 1945 by the present applicant. Suitable machinery for drawing the extruded plastic away from the extrusion orifice and cooling it is described in applicant's application Serial No. 549,375, filed August 14, 1944, now abandoned in favor of continuing application Serial No. 783,252, filed October 31, 1944.

During the mixing of the color concentrate into the heated resin, the liquid monomer portion of the concentrate tends to polymerize, and is in large part converted to non-volatile polymers which become mixed throughout the resin. A part of the monomer may persist as such through to the extrusion step, at which point it is usually lost by volatilization from the extruded product. In any case, the monomer in the color concentrate does not appear to affect the properties or appearance of the extruded colored resin in any way.

The process of Fig. 2 is useful primarily in incorporating pigments into the resins, although it may also be used in adding dyes. In the first step of this process, the pigment 11 is mixed with polystyrene, usually uncolored molten polymer from the reservoir 7, although polymer from another source, which need not be of the same molecular weight as the resin to be colored, may also be used. The mixing is preferably, though not necessarily, effected at a temperature at which the polymer is plastic, in any convenient mixing equipment 12, such as a plasticator, and the resulting color concentrate is transferred to storage 13. The color concentrate may be stored molten, or, often more conveniently, may after mixing be extruded into rod which can be cooled and cut up into granules, which are stored and later remelted as needed.

The relative proportions of pigment and polymer in the concentrate are not critical, the concentration being chosen to secure the desired color intensity in the final product. In ordinary cases, the pigment usually represents from 10 to 50 per cent by weight of the polymer in the concentrate.

In mixing the color concentrate and the uncolored polystyrene, the concentrate, in the plastic state, is metered as a stream by the feeder 14 into the mixing and extruding system 9, in which it is mixed with a larger metered stream of uncolored polystyrene from the reservoir 7. Mixing and extrusion of the blended product are carried out as described with respect to Fig. 1.

The following examples will further illustrate the invention:

Example 1

In coloring polystyrene according to the process of Fig. 1, a color concentrate was prepared by stirring 0.20 pounds of Oil Red O dye into 100 pounds of monomeric styrene. This mixture was then metered at a rate of 2.60 pounds per hour into a mixer-extruder such as that described above. At the same time, molten uncolored polystyrene at about 250° C. having an average molecular weight of about 100,000, and a volatile content of 1.0 per cent was metered as a stream at a rate of 260 pounds per hour into the mixer-extruder. The resulting extruded material was a uniformly colored, commercially acceptable product, showed no change in average molecular weight, and had a volatile content of 1.3 per cent.

Example 2

In coloring polystyrene according to the process of Fig. 2, a color concentrate was made by plastically working together 100 pounds of Mapico Brown pigment and 500 pounds of polystyrene. This concentrate was then fed as a stream into a mixer-extruder at a rate of 4 pounds per hour, together with a stream of 400 pounds per hour of uncolored polystyrene at a temperature of 250° C. The resulting extruded product was a uniformly colored, commercially acceptable material.

What is claimed is:

1. A continuous process for producing uniformly colored articles from thermoplastic resinous polymerized vinyl aromatic compounds which comprises: forming a color concentrate by mixing together a coloring material and a polymerized vinyl aromatic compound, delivering a stream of the color concentrate in the molten state and a relatively much larger stream of the molten uncolored resinous compound to a closed mixing zone maintained at a temperature of at least 200° C. and therein working the materials together to form a uniformly colored mass while still in stream form, and continuously extruding the mass.

2. A continuous process for producing uniformly colored articles from polystyrene which comprises: forming a color concentrate by mixing together a coloring material and polystyrene at a temperature at which the latter is plastic, delivering a molten stream of the color concentrate and a relatively much larger stream of molten uncolored polystyrene to a closed mixing zone maintained at a temperature of at least 200° C. and therein working the materials together to form a uniformly colored mass while still in stream form, and continuously extruding the mass.

3. A process according to claim 2 wherein the coloring material is a finely-divided pigment.

4. In a process for producing uniformly colored thermoplastic resinous polymerized vinyl aromatic compounds wherein a coloring material is mixed with the resinous polymer, the improvement which comprises: first forming a fluid mixture of a coloring material and a polymer of the vinyl aromatic compound, delivering a stream of such fluid mixture and a relatively much larger stream of the uncolored resin in the molten state in controlled proportions to a mixing zone and therein working the materials together while still in stream form to produce a uniformly colored mass, and continuously removing a stream of the colored mass from the zone.

5. In a process of producing uniformly colored resinous polystyrene wherein a coloring material is mixed with the said resin, the improvement which comprises: forming a color concentrate by mixing together a coloring material and polystyrene at a temperature at which the latter is plastic, delivering a molten stream of the color concentrate and a relatively much larger stream of molten uncolored polystyrene in controlled proportions to a closed mixing zone maintained at a temperature of at least 200° C. and therein working the materials together while still in stream form to produce a uniformly colored mass, and continuously removing a stream of the colored mass from the zone.

KENNETH E. STOBER.

REFERENCES CITED

The following references are of record in the file of this patent:

UNITED STATES PATENTS

| Number | Name | Date |
|---|---|---|
| 1,528,291 | Dreyfus | Mar. 3, 1925 |
| 1,627,195 | Ostromislensky | May 3, 1927 |
| 1,966,327 | Wood | July 10, 1934 |
| 2,074,285 | Studt | Mar. 16, 1937 |
| 2,109,592 | Macht et al. | Mar. 1, 1938 |
| 2,279,067 | Shapiro | Apr. 7, 1942 |
| 2,303,340 | Dreyfus | Dec. 1, 1942 |
| 2,326,531 | Gates | Aug. 10, 1943 |
| 2,374,069 | Balthis | Apr. 17, 1945 |

FOREIGN PATENTS

| Number | Country | Date |
|---|---|---|
| 498,679 | Great Britain | Jan. 9, 1939 |